US012698185B2

(12) United States Patent
Ruhnke

(10) Patent No.: US 12,698,185 B2
(45) Date of Patent: Aug. 4, 2026

(54) RESETTING A SAFETY ACTUATOR IN AN ELEVATOR SYSTEM

(71) Applicant: Otis Elevator Company, Farmington, CT (US)

(72) Inventor: Jan Ruhnke, Berlin (DE)

(73) Assignee: OTIS ELEVATOR COMPANY, Farmington, CT (US)

( * ) Notice: Subject to any disclaimer, the term of this patent is extended or adjusted under 35 U.S.C. 154(b) by 965 days.

(21) Appl. No.: 17/966,072

(22) Filed: Oct. 14, 2022

(65) Prior Publication Data

US 2023/0399199 A1 Dec. 14, 2023

(30) Foreign Application Priority Data

Jun. 9, 2022 (EP) .................................... 22178250

(51) Int. Cl.
*B66B 5/00* (2006.01)
*B66B 5/22* (2006.01)

(52) U.S. Cl.
CPC .............. *B66B 5/0087* (2013.01); *B66B 5/22* (2013.01)

(58) Field of Classification Search
CPC ............ B66B 1/32; B66B 5/22; B66B 5/0087
See application file for complete search history.

(56) References Cited

U.S. PATENT DOCUMENTS 7,434,664 B2 10/2008 Helstrom
7,681,693 B2 3/2010 Tegtmeier et al.
8,789,659 B2 7/2014 Agirman et al.
8,960,371 B2 2/2015 Schoenauer et al.
9,457,989 B2 * 10/2016 Meierhans ................ B66B 5/20
10,189,676 B2 1/2019 Hovi et al.
10,562,739 B2 * 2/2020 Hu ............................ B66B 5/22
10,889,467 B2 * 1/2021 Wroblewski .............. B66B 5/06
11,066,274 B2 * 7/2021 Khzouz ...................... B66B 5/18
11,078,045 B2 * 8/2021 Billard ...................... B66B 5/18
11,192,751 B2 12/2021 Nakari et al.
11,267,677 B2 3/2022 Ruhnke et al.
11,434,104 B2 * 9/2022 Fargo ........................ B66B 5/18
11,827,494 B2 * 11/2023 Aguado-Martin ........ B66B 5/06
11,845,634 B2 * 12/2023 Sotoca ...................... B66B 5/22
11,848,154 B2 * 12/2023 Billard ...................... B66B 5/16
(Continued)

FOREIGN PATENT DOCUMENTS

CN 101037167 A 9/2007
CN 110027959 A 7/2019
(Continued)

OTHER PUBLICATIONS

European Search Report for application EP 22178250, dated Nov. 15, 2022, 66 pages.

*Primary Examiner* — Michael A Riegelman
(74) *Attorney, Agent, or Firm* — CANTOR COLBURN LLP

(57) ABSTRACT

A method of resetting a safety actuator (52) in an elevator system. An elevator controller receives a signal to reset the safety actuator (52) and moves the elevator car upwards relative to the guide rail (106*a*) so as to release the safety brake (48). A safety board controller is instructed to operate an electromagnet (62) in the safety actuator (52) to pull a magnetic actuator pad (54') laterally away from the guide rail (106*a*) to a reset position while the elevator car is moving upwards during the reset operation.

14 Claims, 7 Drawing Sheets

(56) References Cited

U.S. PATENT DOCUMENTS

| | | | | |
|---|---|---|---|---|
| 12,330,917 | B2 * | 6/2025 | Aguado-Martin | B66B 17/34 |
| 2007/0000736 | A1 * | 1/2007 | Shikai | B66B 5/02<br>187/393 |
| 2015/0240894 | A1 * | 8/2015 | Piech | B66B 5/18<br>188/163 |
| 2018/0327224 | A1 * | 11/2018 | Billard | B66B 5/04 |
| 2019/0062113 | A1 * | 2/2019 | Hu | B66B 9/00 |
| 2019/0345002 | A1 * | 11/2019 | Wroblewski | B66B 5/06 |
| 2020/0071129 | A1 * | 3/2020 | Ruhnke | B66B 1/3461 |
| 2020/0130985 | A1 * | 4/2020 | Ruhnke | B66B 5/22 |
| 2021/0375517 | A1 * | 12/2021 | Billard | B66B 5/18 |
| 2022/0106164 | A1 * | 4/2022 | Sotoca | B66B 5/22 |
| 2023/0055159 | A1 * | 2/2023 | Aguado-Martin | B66B 5/22 |
| 2023/0399199 | A1 * | 12/2023 | Ruhnke | B66B 5/0087 |
| 2024/0059526 | A1 * | 2/2024 | Aguado-Martin | B66B 17/34 |

FOREIGN PATENT DOCUMENTS

| | | | |
|---|---|---|---|
| CN | 110817624 | A | 2/2020 |
| CN | 112591577 | A | 4/2021 |
| EP | 3133037 | B1 | 10/2018 |
| EP | 3190076 | B1 | 6/2019 |
| EP | 3072842 | B1 | 9/2019 |
| EP | 2927174 | B1 | 1/2020 |
| EP | 2528226 | B1 | 8/2020 |
| EP | 3336032 | B1 | 10/2020 |
| EP | 3403971 | B1 | 10/2020 |
| EP | 3539913 | B1 | 4/2021 |
| EP | 3480155 | B1 | 11/2021 |
| JP | 2021070560 | A | 5/2021 |
| WO | 2021105192 | A1 | 6/2021 |

* cited by examiner

RESETTING A SAFETY ACTUATOR IN AN ELEVATOR SYSTEM

FOREIGN PRIORITY

This application claims priority to European Patent Application No. 22178250.1, Jun. 9, 2022, and all the benefits accruing therefrom under 35 U.S.C. § 119, the contents of which in its entirety are herein incorporated by reference.

TECHNICAL FIELD

This disclosure relates to a method of resetting a safety actuator in an elevator system, and to a related elevator system.

BACKGROUND

It is well-known for elevator cars to include safety brakes. The function of the safety brakes is to be triggered in the event of elevator car over-speed, over-acceleration or freefall. Once triggered, the safety brakes engage with the guide rails in order to stop any motion of the elevator car.

Traditional safety brakes (or "safeties") are located on either side of the elevator car, and mechanically synchronized by virtue of a linkage bar that goes across the elevator car structure. One of the safeties is connected to a governor rope, such that over-speed of the elevator car will cause relative movement of the governor rope and a part of the safety, triggering the safety to be engaged. Engagement of that safety will transfer motion to the safety on the opposite side of the elevator car, via the linkage bar, such that both safeties are triggered to engage the guide rails on either side of the elevator car.

More recently, the traditional governor over-speed system with its mechanical safety actuation has been replaced by a safety controller in communication with a so-called electronic safety actuator (ESA) for each safety brake. The ESA can include a magnetic component that makes contact with the guide rail so as to trigger the safety brake. Once the safety brake has been triggered, manual intervention is required to dislodge and release the safety brake by moving the elevator car upwards before the ESA can be reset. This might take place as part of an emergency rescue operation if passengers are trapped inside the elevator car.

However, to successfully achieve reset of the ESA, the elevator car must be moved to a position allowing the magnetic component to be aligned with an electromagnetic coil. This alignment is often hindered by any swinging or bounce of the elevator car. Furthermore, adjustment of the elevator car position can be difficult when the elevator car is close to the top of the hoistway. It is common for multiple attempts to be made before the ESA is reset and the elevator car can be put back into motion. This is inefficient and also distressing for any passengers trapped inside the elevator car.

SUMMARY

According to a first aspect of this disclosure there is provided a method of resetting a safety actuator in an elevator system, wherein: the elevator system comprises an elevator car driven to move along a guide rail, a safety brake mounted to the elevator car and operable to prevent movement of the elevator car along the guide rail, and a safety actuator mounted to the elevator car, the safety actuator comprising a magnetic actuator pad moveable laterally relative to the guide rail; the safety actuator is mechanically coupled to the safety brake and configured to trigger the safety brake when the magnetic actuator pad is pushed laterally against the guide rail to create relative movement between the safety brake and the elevator car; and the safety actuator comprises an electromagnet operable to pull the magnetic actuator pad laterally away from the guide rail when the electromagnet is aligned with the magnetic actuator pad during a reset operation; the method comprising: upon receiving a signal to reset the safety actuator, moving the elevator car upwards relative to the guide rail so as to release the safety brake; and operating the electromagnet to pull the magnetic actuator pad laterally away from the guide rail to a reset position while the elevator car is moving upwards during the reset operation.

It will be understood that the reset operation for the safety actuator takes place without stopping the elevator car. Rather than attempting to move the elevator car to a position where the electromagnet is expected to align with the magnetic actuator pad and stopping at that position before operating the electromagnet, the elevator car is kept moving during the reset operation. This avoids any bounce or swing that can occur when the elevator car stops. For example, just 4-5 mm of bounce can prevent alignment so that the reset operation fails.

The safety actuator is configured to trigger the safety brake when the magnetic actuator pad is pushed laterally against the guide rail, e.g. into a triggering position. In this triggering position the magnetic actuator pad is in contact with the guide rail, and due to the relative downwards motion of the safety actuator compared to the magnetic actuator pad in contact with the guide rail, an upwards reaction force will be created and transmitted by the linkage mechanism to the safety brake, thereby moving the safety brake into a braking position to engage with the guide rail and stop motion of the elevator car. It will be understood by the skilled person that the contact between the magnetic actuator pad and the guide rail results in a frictional force between the magnetic actuator pad and the guide rail, but this frictional force alone is not strong enough to cease downwards motion of the elevator car relative to the guide rail. In the triggering position, the magnetic actuator pad has moved laterally to contact the guide rail but there may still be a degree of relative vertical movement between them. It is the engagement of the safety brake with the guide rail that creates a much larger frictional force to bring the elevator car to a stop. When the safety brake is triggered, the safety brake is brought into intentional hard contact with the guide rail to create an engagement functioning to achieve a frictional braking force sufficient to prevent all movement of the elevator car.

In some examples, the method further comprises monitoring the vertical position of the elevator car while moving the elevator car upwards relative to the guide rail so as to determine an alignment position where the electromagnet is aligned with the magnetic actuator pad.

In some examples, the method further comprises: after the elevator car has reached the alignment position, continuing to move the elevator car upwards relative to the guide rail while operating the electromagnet to pull the magnetic actuator pad laterally away from the guide rail.

For example, by determining when the elevator car has reached the alignment position, it is made possible that the electromagnet is only operated after alignment has been achieved.

In some examples, the safety actuator comprises a hard stop configured to prevent relative movement between the electromagnet and the magnetic actuator pad once the electromagnet is aligned with the magnetic actuator pad during upwards movement of the elevator car, the method comprising: operating the electromagnet to pull the magnetic actuator pad laterally away from the guide rail after the magnetic actuator pad has reached the hard stop. It will be understood that upwards movement of the elevator car brings the stop into contact with the magnetic actuator pad so that the electromagnet and the magnetic actuator pad are aligned during continued upwards movement of the elevator car.

In some examples, the elevator system comprises an elevator controller arranged to drive movement of the elevator car along the guide rail and the safety actuator comprises a safety board controller in communication with the elevator controller. The elevator controller may be arranged to receive a signal to reset the safety actuator and to first drive movement of the elevator car upwards relative to the guide rail so as to release the safety brake; and the elevator controller may then send a reset signal to the safety board controller to operate the electromagnet to pull the magnetic actuator pad away from the guide rail while the elevator car is still moving upwards during the reset operation.

In some examples, wherein the elevator car is driven to move along a pair of guide rails, the elevator system comprising a pair of the safety brakes mounted either side of the elevator car with corresponding first and second safety actuators mechanically coupled to the pair of the safety brakes, the method may comprise: operating a first electromagnet of the first safety actuator to pull the magnetic actuator pad away from a first guide rail of the pair to a reset position while the elevator car is moving upwards during the reset operation; and subsequently operating a second electromagnet of the second safety actuator to pull the magnetic actuator pad away from a second guide rail of the pair to a reset position while the elevator car is still moving upwards during the reset operation.

According to a second aspect of this disclosure there is provided an elevator system comprising: an elevator car moveable along a guide rail; an elevator controller arranged to drive movement of the elevator car along the guide rail; a safety brake mounted to the elevator car and operable to prevent movement of the elevator car along the guide rail; and a safety actuator mounted to the elevator car, the safety actuator comprising a magnetic actuator pad moveable laterally relative to the guide rail; wherein the safety actuator is mechanically coupled to the safety brake and configured to trigger the safety brake when a magnetic actuator pad is pushed laterally against the guide rail to create relative movement between the safety brake and the elevator car; wherein the safety actuator comprises an electromagnet operable to pull the magnetic actuator pad laterally away from the guide rail when the electromagnet is aligned with the magnetic actuator pad during a reset operation; wherein the elevator controller is arranged, upon receiving a signal to reset the safety actuator, to move the elevator car upwards relative to the guide rail so as to release the safety brake; and wherein the elevator controller is arranged to send a signal to operate the electromagnet to pull the magnetic actuator pad laterally away from the guide rail to a reset position while the elevator car is moving upwards during the reset operation.

As mentioned above, the reset operation takes place while the elevator car continues to move upwards, so as to avoid any bounce or swing that could interfere with alignment between the electromagnet and the magnetic actuator pad. The elevator car is moving upwards while the electromagnet is operated to pull the magnetic actuator pad laterally away from the guide rail to its reset position.

After the safety actuator has been successfully reset, the elevator controller can be arranged to stop moving the elevator car upwards (e.g. if the elevator car is close to the top of the hoistway). However, in at least some examples, the elevator controller may continue to drive movement of the elevator car upwards to the next landing before bringing the elevator car to a halt (typically applying a drive brake when the elevator car has stopped). This can enable any trapped passengers to leave the elevator car as soon as possible following the reset operation.

When it is disclosed that the magnetic actuator pad is pushed laterally against the guide rail, it will be appreciated that the magnetic actuator pad may be pushed under its own magnetic attraction, for example because the magnetic actuator pad comprises a permanent magnet that is naturally attracted to a ferrous guide rail. In some examples, in addition or alternatively, it will be appreciated that the magnetic actuator pad may be pushed by a repulsive magnetic force, for example actively generated by the electromagnet. In at least some examples, in addition or alternatively, the magnetic actuator pad may be pushed by a spring bias force.

When it is disclosed that the safety actuator comprises an electromagnet operable to pull the magnetic actuator pad laterally away from the guide rail, it will be appreciated that the electromagnet may be generating a magnetic force that directly attracts the magnetic actuator pad (e.g. overcoming any natural magnetic attraction to a ferrous guide rail). In some examples, in addition or alternatively, it will be appreciated that the electromagnet may be operated (e.g. by changing the current) to remove a repulsive magnetic force so that the magnetic actuator pad is pulled laterally away from the guide rail, e.g. under a reversal of the magnetic field to cause an attraction and/or under a spring bias force.

In some examples, the magnetic actuator pad comprises a ferromagnetic material. The magnetic actuator pad may include any ferromagnetic material such as iron, cobalt, nickel, or an alloy of any of these metals. In such examples the magnetic actuator pad is not itself magnetically attracted to a ferrous guide rail. The inclusion of ferromagnetic material allows the magnetic actuator pad to be magnetised in the presence of a magnetic field applied by the electromagnet.

In some examples, the magnetic actuator pad is permanently magnetic, e.g. comprising a permanent magnet material. In such examples the magnetic actuator pad is magnetically attracted to a ferrous guide rail and the electromagnet must overcome this natural attraction to pull the magnetic actuator pad away from the guide rail.

In some examples, the electromagnet is fixed in the safety actuator. In some examples, the electromagnet is moveable in the safety actuator.

In some examples, the elevator system further comprises a position monitoring system arranged to monitor the vertical position of the elevator car, wherein the elevator controller is in communication with the position monitoring system and arranged to determine an alignment position where the electromagnet is aligned with the magnetic actuator pad. The position monitoring system can be any device or mechanism for monitoring a vertical position of the elevator car, as known in the art. For example, without limitation, the position monitoring system can include an encoder and/or an absolute position sensor.

In some examples, the elevator controller is arranged to send the signal to operate the electromagnet after the elevator car has reached the alignment position, while continuing to drive movement of the elevator car upwards relative to the guide rail.

In some examples, the safety actuator comprises a hard stop configured to prevent relative movement between the electromagnet and the magnetic actuator pad once the electromagnet is aligned with the magnetic actuator pad during upwards movement of the elevator car.

In some examples, the elevator controller is arranged to send the signal to operate the electromagnet after the magnetic actuator pad has reached the hard stop.

In some examples, the safety actuator comprises a safety board controller in communication with the elevator controller; the elevator controller is arranged to receive a signal to reset the safety actuator and to first drive movement of the elevator car upwards relative to the guide rail so as to release the safety brake; and the elevator controller is arranged to then send a reset signal to the safety board controller to operate the electromagnet to pull the magnetic actuator pad away from the guide rail while the elevator car is still moving upwards during the reset operation.

In some examples, the elevator system comprises a pair of guide rails along which the elevator car is driven to move, a pair of the safety brakes mounted either side of the elevator car, and corresponding first and second safety actuators mechanically coupled to the pair of the safety brakes, wherein the elevator controller is arranged to: send a first signal to operate a first electromagnet of the first safety actuator to pull the magnetic actuator pad away from a first guide rail of the pair while the elevator car is moving upwards during the reset operation; and subsequently send a second signal to operate a second electromagnet of the second safety actuator to pull the magnetic actuator pad away from a second guide rail of the pair while the elevator car is still moving upwards during the reset operation.

It will be understood from this disclosure that triggering the safety brake means bringing (a component of) the safety brake into physical engagement with the guide rail to stop the car. It will also be understood from this disclosure that releasing the safety brake means physically disengaging (a component of) the safety brake from the guide rail to allow the car to move along the guide rail. In some examples, the safety brake is arranged to be moveable between a non-braking position where the safety brake is not in engagement with the guide rail and a braking position where the safety brake is engaged with the guide rail to prevent movement of the elevator car along the guide rail. It will be appreciated that this can be contrasted with operation of the magnetic actuator pad, since lateral movement of the magnetic actuator pad into contact with the guide rail does not prevent movement of the elevator car along the guide rail.

The safety brake may comprise any suitable arrangement for stopping and preventing movement of the elevator car via mechanical engagement with the guide rail. In some examples, the safety brake comprises a wedge brake. Some suitable wedge brake arrangements include a roller mounted to move relative to a wedge, or one or more wedge-shaped brake pads mounted to move into engagement with a guide rail. Therefore, movement of the linkage coupled between the wedge brake and the safety actuator is such that when the safety actuator is moving downwards relative to the guide rail, lateral movement of the magnetic actuator pad to the triggering position creates an upwards reaction force transmitted by the linkage to move the wedge brake upwards into an engaged i.e. braking position. The wedge brake will be engaged against the guide rail and the friction between these two surfaces will bring the elevator car to a halt.

DETAILED DESCRIPTION

Certain preferred examples of this disclosure will now be described, by way of example only, with reference to the accompanying drawings, in which.

DETAILED DESCRIPTION

Figure 1:
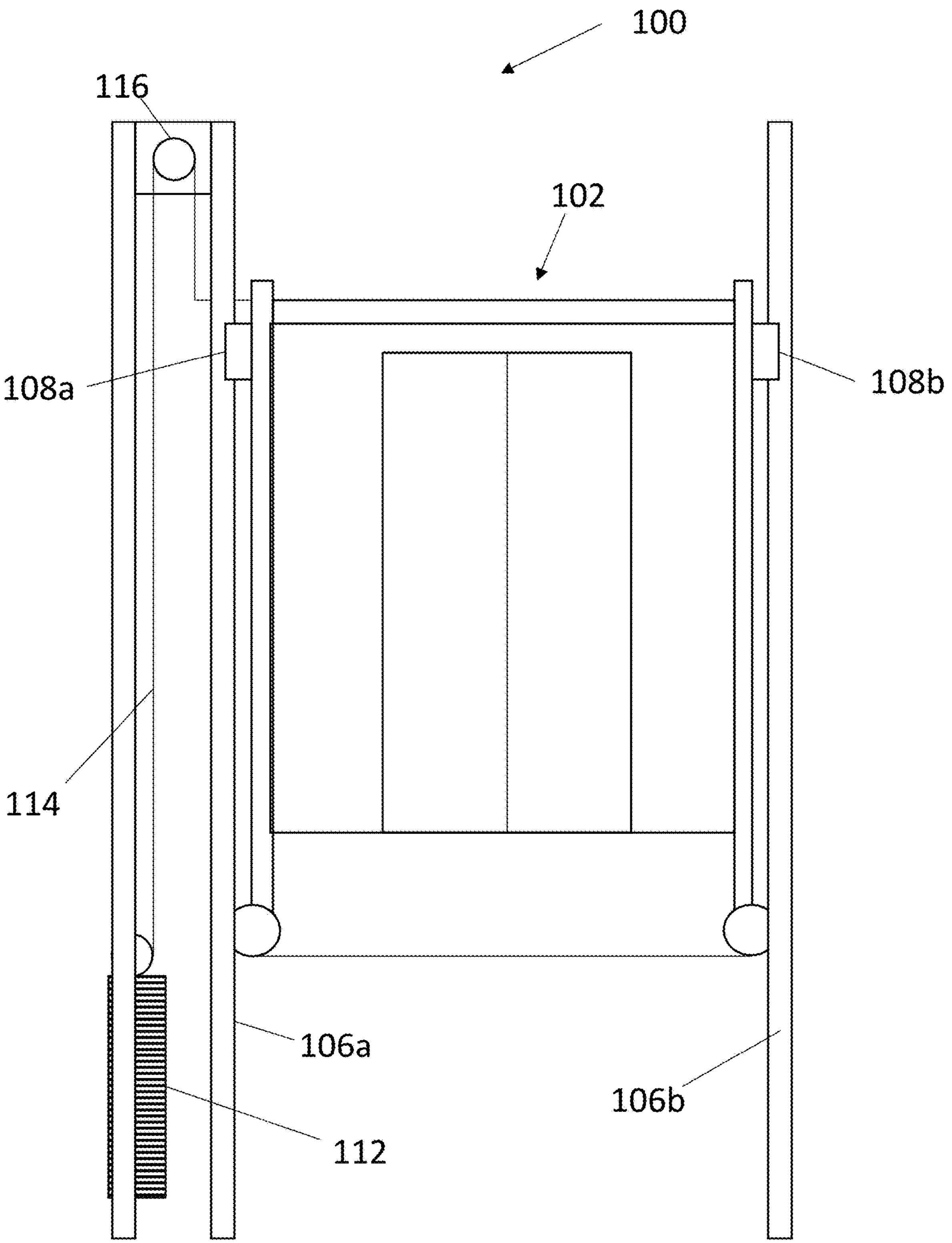
FIG. 1 shows a schematic side view of an elevator system according to an example of the present disclosure.

FIG. 1 shows an elevator system 100 according to the present disclosure. The elevator system 100 includes an elevator car 102 (e.g. arranged to travel within a hoistway, not shown). The elevator car 102 travels along a first guide rail 106*a*, which is located on a first side of the hoistway 104, and a second guide rail 106*b*, which is located on a second, opposite side of the hoistway 104.

The elevator car 102 includes a first safety brake device 108*a*, positioned on a first side of the elevator car 102 and a second safety brake device 108*b* positioned on a second side of the elevator car 102. These safety brake devices 108*a*, 108*b* each include a safety brake to stop the elevator car 102 and, in the illustrated example, an integrated safety actuator for triggering the safety brake, as will be described in more detail below.

The elevator car 102 is connected to a counterweight 112 by one or more tension members 114. The tension members 114 may include or be configured as, for example, ropes, cables, and/or coated belts including load-bearing cords. The tension member is driven by a machine 116 to drive motion of the elevator car 102 and the counterweight 112. The counterweight 112 is configured to balance a load of the elevator car 102 and to facilitate movement of the elevator car 102 concurrently and in an opposite direction with respect to the counterweight 112 along the guide rails 106*a*, 106*b*.

The elevator system 100 includes an elevator controller (not shown) configured to control the operation of the elevator system 100, and particularly the vertical movement of the elevator car 102. For example, the elevator controller may provide drive signals to the machine 116 to control the acceleration, deceleration, leveling, stopping, etc. of the elevator car 102. The elevator controller may also be configured to receive position signals from a position reference system (seen in FIGS. 5 and 6).

Although shown and described with a roping system including one or more tension members 114, the elevator system 100 may employ other methods and mechanisms of moving the elevator car 102. For example, embodiments may be employed in ropeless elevator systems using a linear motor to impart motion to the elevator car 102. Embodiments may also be employed in ropeless elevator systems using a hydraulic lift to impart motion to the elevator car 102. FIG. 1 is merely a non-limiting example presented for illustrative and explanatory purposes.

Figure 2:
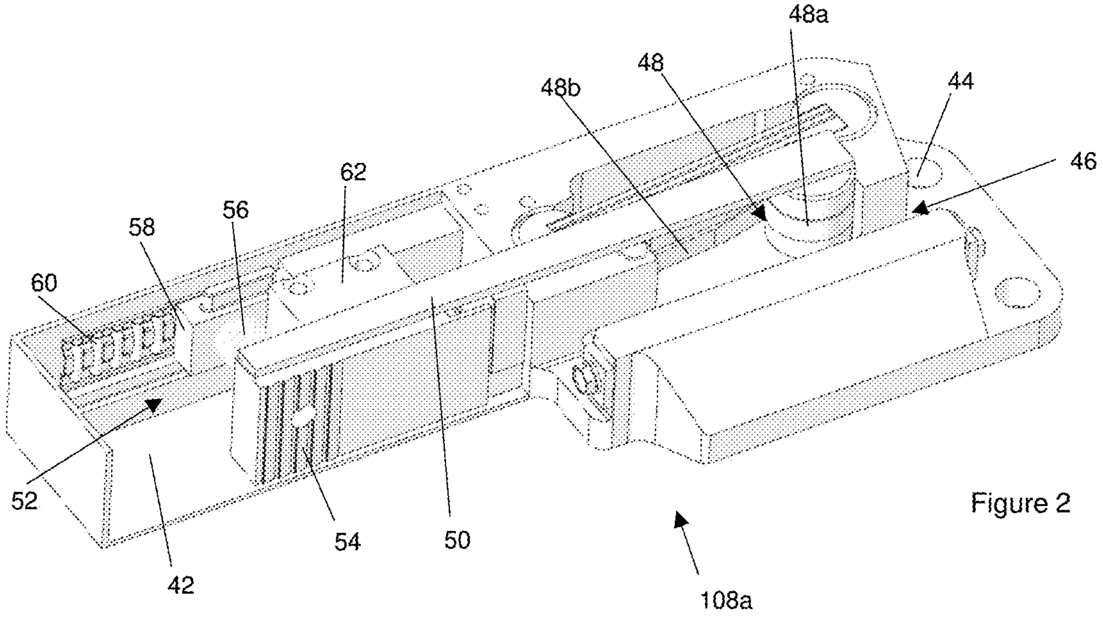
FIG. 2 shows an example of safety actuator device.

FIG. 2 shows an example of a safety brake device 108*a* which can be mounted onto the elevator car 102 of FIG. 1. The safety brake device 108*a* includes a safety actuator 52 mechanically coupled to a safety brake 48, in this example by a rod 50 (or other mechanical linkage). The safety brake device 108*a* includes a mounting portion 42 which may be mounted on the external surface of the elevator car 102. For example, the mounting portion 42 includes apertures 44 which enable fixation of the mounting portion 42 to the elevator car frame. The safety brake device 108*a* further comprises a channel 46 which extends along the length of the safety brake device 108*a* and is configured to accommodate the guide rail 106*a* (not shown).

The safety actuator 52 includes an electromagnet 62 and a magnetic actuator pad 54. The magnetic actuator pad 54 is selectively deployed by operation of the electromagnet 62 to contact the guide rail 106*a* (seen in FIG. 1) which is arranged in the channel 46 when the safety brake device 108*a* is mounted to the elevator car 102. As seen in FIG. 2, it is the magnetic actuator pad 54 of the safety actuator 52 that is operably coupled to the safety brake 48 by the rod 50. The magnetic actuator pad 54 is moveable relative to the mounting portion 42. When the safety brake 48 is triggered, for example in an over-speed situation, relative upward movement of the magnetic actuator pad 54 pulls on the rod 50 to engage the safety brake 48 by bringing it into a braking position e.g. wedged against the guide rail 106*a*, as illustrated in FIGS. 3A-3C.

The safety brake 48 is moveable between a non-braking position where the safety brake 48 is not in engagement with the guide rail 106*a*, and a braking position where the safety brake 48 is engaged with the guide rail 106*a*. The safety brake 48 is illustrated as a wedge-type safety brake comprising an angled "wedge" surface 48*b* and a roller 48*a* moveable along the surface 48*b* from a non-braking position (as seen in FIG. 2) to a braking position where the roller 48*a* is brought into engagement with the guide rail 106*a*. Such wedge-type safety brakes are well-known in the art, for example as seen in U.S. Pat. No. 4,538,706. However, it will be appreciated that the safety brake 48 may take any suitable form and could instead comprise a wedge-shaped brake pad instead of the roller, or a magnetic actuator pad.

In the example seen in FIG. 2, the magnetic actuator pad 54 is ferromagnetic and the safety actuator 52 comprises a spring 56, a support 58, and a set of linear roller bearings 60 arranged between the magnetic actuator pad 54 and the mounting portion 42. The magnetic actuator pad 54 is movable laterally between a first position spaced from the guide rail 106*a* (as seen in FIG. 2) and a triggering position in contact with the guide rail 106*a*, as will be described with reference to FIGS. 3A, 3B and 3C. The spring 56 is coupled at one end to the magnetic actuator pad 54 and is configured to apply a biasing force to move the magnetic actuator pad 54 from the first position to the triggering position. The spring 56 is coupled at its other end to the support 58. The support 58 is in contact with the linear roller bearings 60 such that the support 58, spring 56, and the magnetic actuator pad 54 are moveable linearly relative to the mounting portion 42 (i.e. in a vertical direction when the safety device 108*a* is mounted to an elevator car). In this example, the electromagnet 62 is fixed in position relative to the mounting portion 42 and is arranged to apply a magnetic force to the hold the magnetic actuator pad 54 in the first position. The magnetic force therefore opposes and overcomes the biasing force of the spring 56.

Figure 3A:
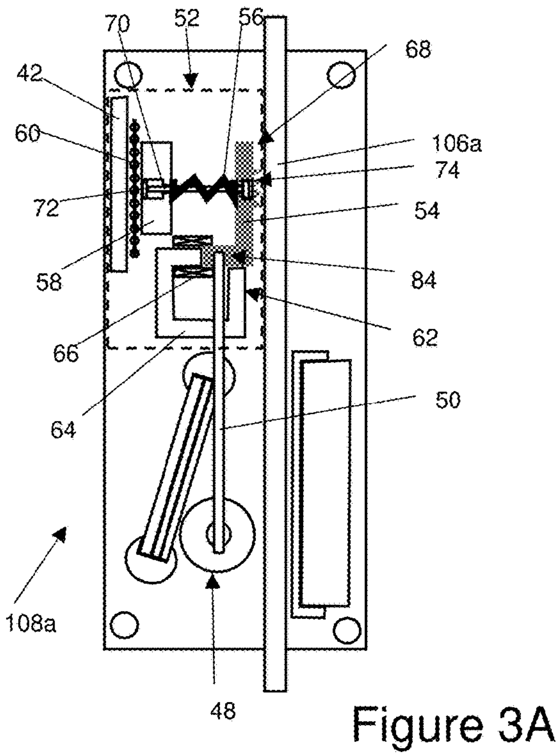
FIGS. 3A-3C show the safety actuator device during a triggering operation for the safety brake.
Figure 3B:
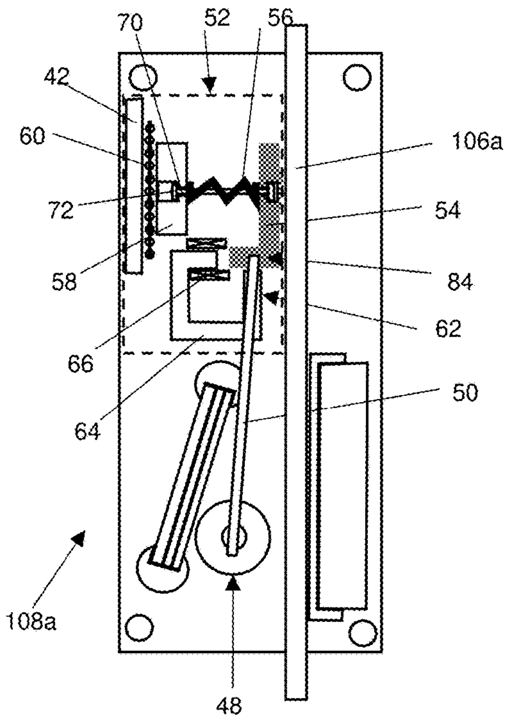
Figure 3C:
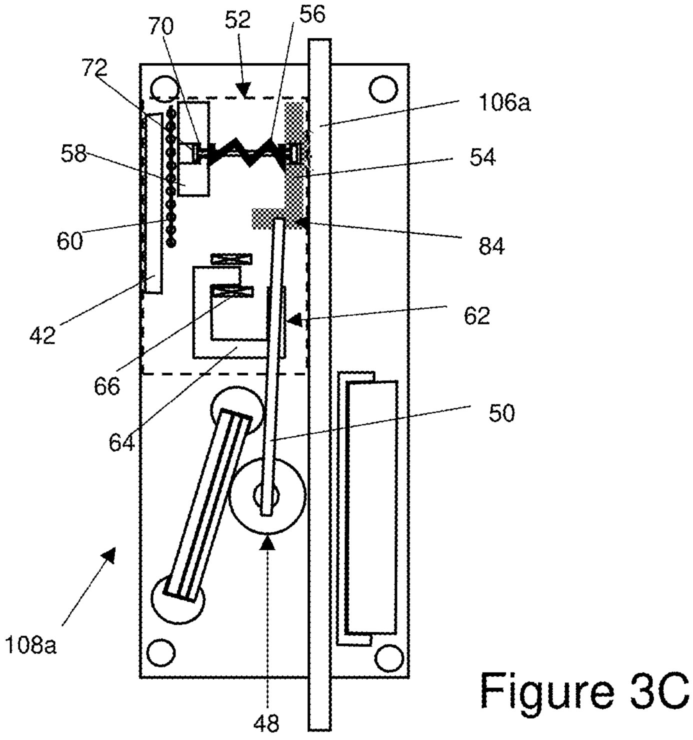

Turning now to FIGS. 3A, 3B and 3C, there is seen a schematic side view of the example of the safety brake device 108*a* shown in FIG. 2, in use. FIGS. 3A-3C are shown in the frame of reference of the elevator car 102.

FIG. 3A shows the safety brake device 108*a* in a non-engaged position, e.g. upon initial installation or after release/reset. The safety brake device 108*a* is mounted onto an elevator car via the mounting portion 42 such that the safety brake device 108*a* moves with the elevator car up and down the guide rail 106*a*. The magnetic actuator pad 54 (which is ferromagnetic in this example) is held away from the guide rail 106*a* by the magnetic force provided by the electromagnet 62, which overcomes the biasing force provided by the spring 56. In this example the electromagnet 62 comprises a 'G-shaped' iron core 64 and an electrical coil 66. A controller (seen in FIG. 5) is in electrical communication with the electromagnet 62 and is configured to control a supply of electricity to the electrical coil 66. Therefore, when the safety brake device 108*a* is not triggered, as shown in FIG. 3A, the magnetic actuator pad 54 is in the first position and not in contact with the guide rail 106*a*, such that there is a gap 68 between the magnetic actuator pad 54 and the guide rail 106*a*.

The spring 56 is connected between the magnetic actuator pad 54 and the support 58. A guiding rod 70 is arranged through the centre of the spring 56 and is connected to the support 58 and to the magnetic actuator pad 54 by nuts 72. The magnetic actuator pad 54 has a high friction surface 74 which is arranged to contact the guide rail 106*a* when in the triggering position.

In this example the magnetic actuator pad 54 includes a reset portion 84 that is arranged to form part of the ferromagnetic core 64 inside the electrical coil 66 when the magnetic actuator pad 54 is in the first position. This means that the magnetic actuator pad 54 completes the magnetic circuit of the electromagnet 62, assisting reset of the safety brake device 108*a*.

If a freefall, over-speed, or over-acceleration condition of the elevator car is detected, the elevator controller (seen in FIG. 5) removes or reduces electrical power to the electromagnet 62. In one example the mechanism is bi-stable and arranged such that, upon removal of power to the electrical coil 66, the magnetic actuator pad 54 no longer experiences any magnetic force. As such, the biasing force applied by the spring 56 to the magnetic actuator pad 54 moves the magnetic actuator pad 54 from the first position shown in FIG. 3A to the triggering position shown in FIG. 3B when the elevator car is descending too rapidly. It can be seen from FIGS. 3A-3C how the guiding rod 70 helps to guide lateral movement of the magnetic actuator pad 54.

The contact of the magnetic actuator pad 54 with the guide rail 106*a*, and in particular, the high-friction surface 74 contacting the guide rail 106*a*, causes the connected support 58 and the magnetic actuator pad 54 to move upwards relative to the elevator car. This movement is shown in FIG. 3C and occurs due to the frictional force between the guide rail 106*a* and the magnetic actuator pad 54. The friction between the guide rail 106*a* and the magnetic actuator pad 54 results in an upwards reaction force. This is due to the downwards motion of the elevator car and mounting portion 42 which is fixed to the elevator car.

The magnetic actuator pad 54, spring 56, support 58 and guiding rod 70 are able to move upwards due to the linear roller bearings 60 which allow motion of the support 58 up and down relative to the mounting portion 42. As the support 58 and the magnetic actuator pad 54 move upwards due to the upwards reaction force, this upwards reaction force is applied to the rod 50 which is connected between the magnetic actuator pad 54 and the safety brake 48. The rod 50 therefore transmits the upwards reaction force to the roller 48*a* of the safety brake 48 to move the roller 48*a* upwards along the inclined surface 48*b* into the braking position such that it engages the guide rail 106*a* and prevents further downwards motion of the elevator car, as shown in FIG. 3C. Therefore, when an over-speed or freefall condition of an elevator car is detected by a safety controller (as described further below), the safety brake device 108*a* triggers the safety brake 48 so as to prevent further downwards motion of the elevator car.

To release the safety brake 48, e.g. following an emergency stop procedure, the elevator car is moved upwards to disengage the roller 48*a* from the guide rail 106*a*. To reset the safety actuator 52, the mounting portion 42 is moved upwards until the electromagnet 62 is aligned with the magnetic actuator pad 54. During a reset operation, power is restored to the electromagnet 62 by the controller, creating an attractive magnetic force between the electromagnet 62 and the magnetic actuator pad 54. Re-alignment of the reset portion 84 with the ferromagnetic core 64 helps to strengthen the magnetic field and pull the magnetic actuator pad 54 from its triggering position back to its first position, i.e. reset position. When this magnetic force is stronger than the biasing force caused by the spring 56, the magnetic actuator pad 54 is therefore pulled laterally away from the guide rail 106*a* to the reset position such that the gap 68 forms between the magnetic actuator pad 54 and guide rail 106*a* (as seen in FIG. 3A).

A reset operation for the safety brake device 108*a* will now be described further with reference to FIGS. 4A-4C.

Figures 4A, 4B, 4C:
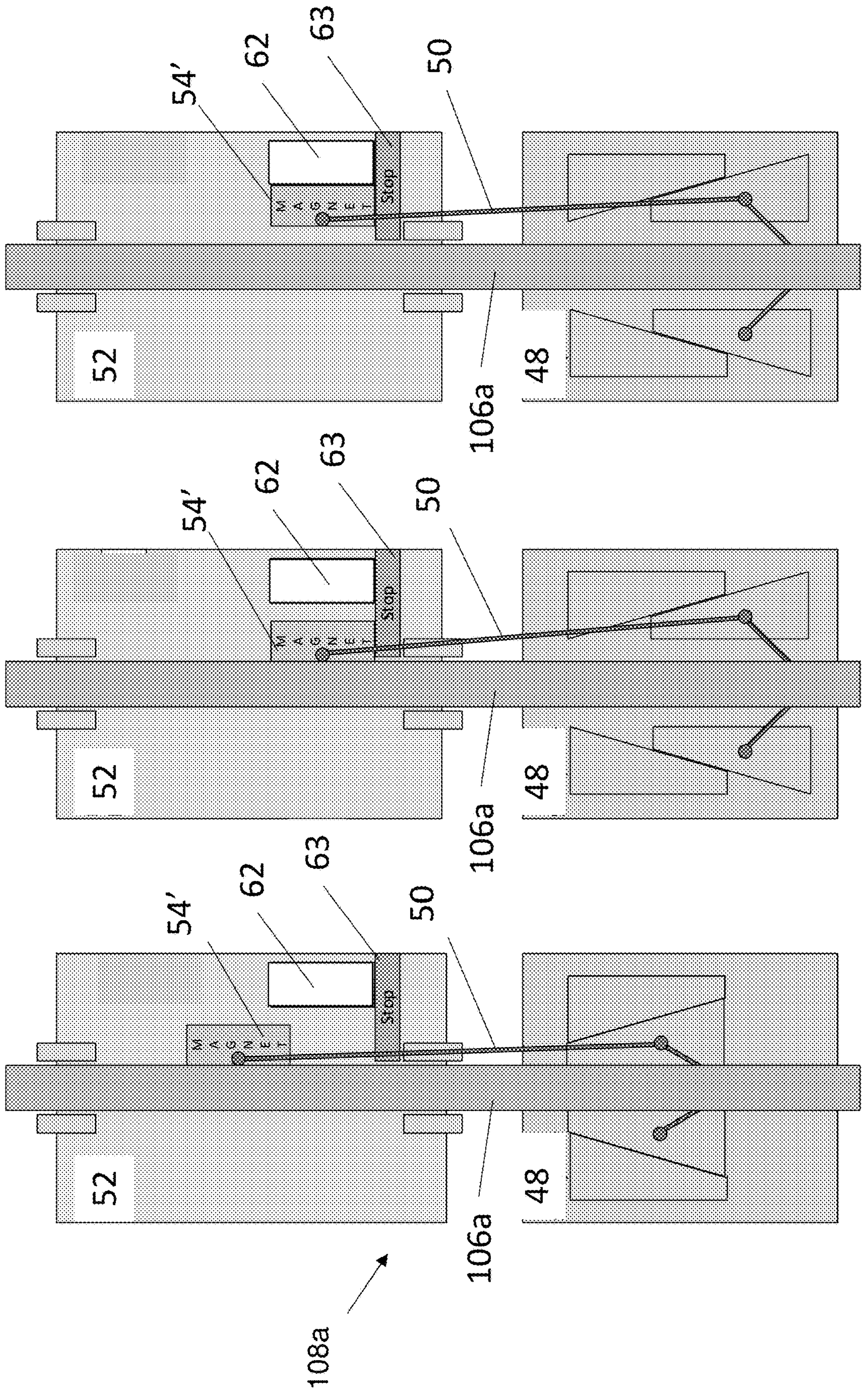
FIGS. 4A-4C show another example of a safety actuator device during a reset operation for the safety actuator.

Turning now to FIGS. 4A-4C there is seen a schematic side view of another example of the safety brake device 108*a* shown in FIG. 2. In this example, the safety brake device 108*a* again includes a safety actuator 52 mechanically coupled to a safety brake 48 by a rod 50 (or other mechanical linkage). The safety brake device 108*a* includes a vertical channel which extends along the length of the safety brake device 108*a* to accommodate the guide rail 106*a*. In this example, the safety actuator 52 includes an electromagnet 62 and a permanently magnetic actuator pad 54'. The permanently magnetic actuator pad 54' is moved laterally by operation of the electromagnet 62 to contact the guide rail 106*a*, as seen in FIG. 4A. When the permanently magnetic actuator pad 54' is in this triggering position, the safety brake 48 is engaged with the guide rail 106*a* to prevent movement of the elevator car (in the same way as seen in FIG. 3C). Relative vertical movement between the electromagnet 62 and the permanently magnetic actuator pad 54' has brought them out of alignment.

During a reset operation, as seen in FIGS. 4B and 4C, the elevator car and hence the safety actuator 52 move upwards relative to the guide rail 106*a* so as to release the wedges of the safety brake 48. After the electromagnet 62 has been brought into alignment with the permanently magnetic actuator pad 54' (FIG. 4B), the electromagnet 62 can be operated to pull permanently magnetic actuator pad 54' laterally away from the guide rail 106*a* to a reset position (FIG. 4C). To ensure the reset operation takes place reliably, the elevator car is driven to continue moving upwards throughout the reset operation.

It can be seen in FIGS. 4A-4C that the electromagnet 62 is fixed in position in the safety actuator 52, together with a stop 63 configured to prevent relative movement between the electromagnet 62 and the permanently magnetic actuator pad 54' once they are aligned (as seen in FIG. 4B) so that they remain aligned during further upwards movement of the elevator car (as seen in FIG. 4C).

Figure 5:
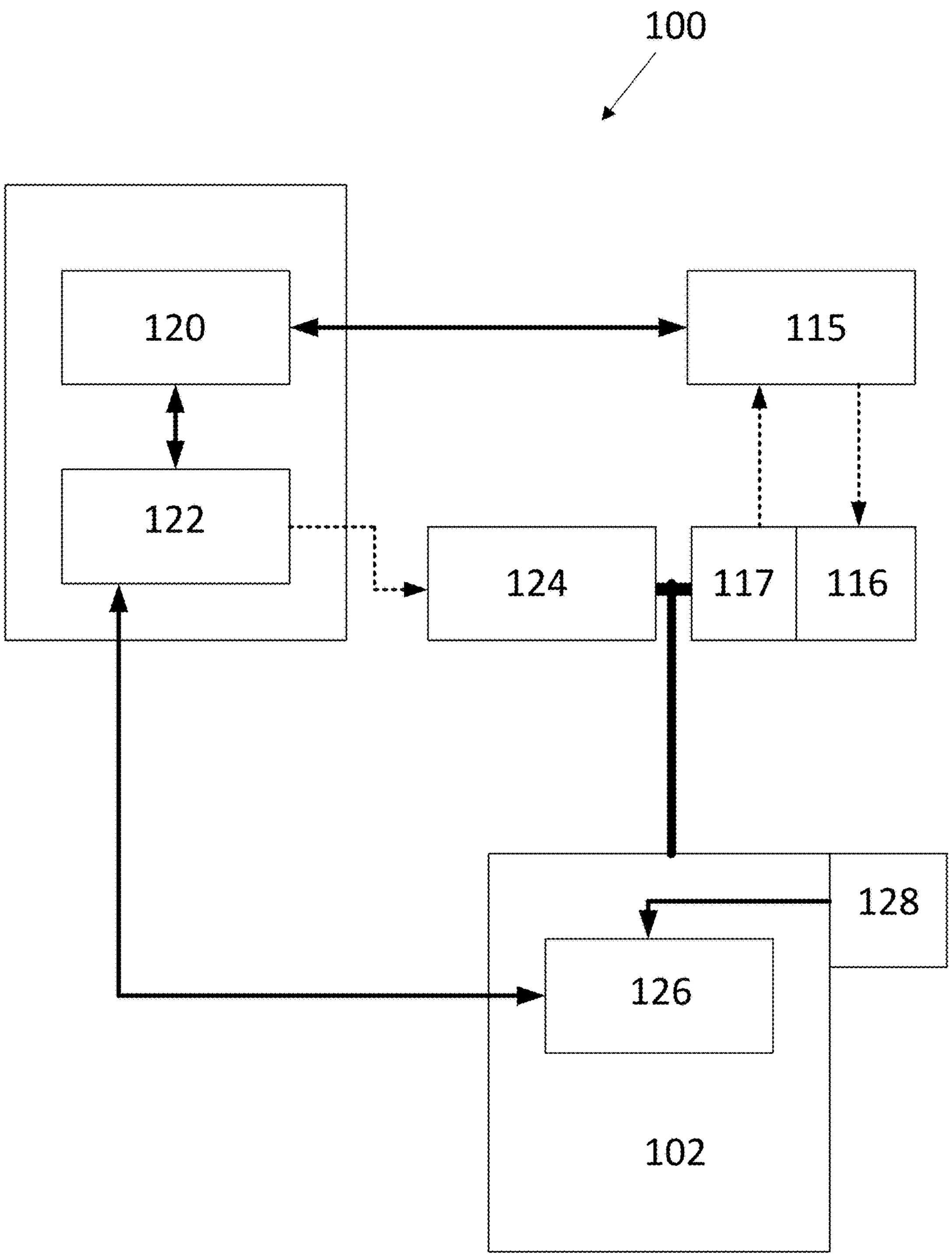
FIG. 5 is a schematic overview for the elevator system.

FIG. 5 provides a schematic overview of the elevator system 100, including the elevator car 102 and a drive unit 115 electrically connected to the machine 116 and an encoder 117. The drive unit 115 is connected to an elevator controller 120 by a CAN. The elevator controller 120 is in communication with a safety controller 122 via a CAN. The safety controller 122 is in electrical connection with, and configured to control, a machine brake 124. The safety controller 122 is also connected by a CAN to a safety board controller 126 mounted at the elevator car 102. A tension member 114 connects the elevator car 102 to the machine 116, encoder 117 and machine brake 124.

The safety board controller 126 provides local control for the safety brake devices 108*a*, 108*b* (seen in FIG. 1) mounted to the elevator car 102. In this example, a position monitoring system 128 is also mounted to the elevator car 102. The position monitoring system 128 can be used to monitor the vertical position of the elevator car 102, especially during a reset operation as described above. The safety controller 122 and elevator controller 120 are in communication with the position monitoring system 128. When at least one of these controllers 120, 122 determines that the elevator car 102 has reached an alignment position where the electromagnet is aligned with the magnetic actuator pad (as seen in FIG. 4B) then from this point onwards, while the elevator car 102 continues to move upwards, the reset operation takes place by operating the electromagnet to pull the magnetic actuator pad laterally away from the guide rail to a reset position (as seen in FIG. 4C).

In an exemplary method of resetting a safety actuator in an elevator system 100 as seen in FIG. 5, the starting point is the safety brakes being engaged. Typically, a service technician goes to a service panel at the elevator controller 120 and activates the safety brake release as a first step. The elevator car 102 is driven to move upwards by the elevator controller 120, for example during an emergency rescue operation. The elevator controller 120 detects when the elevator car 102 has moved far enough to align the electromagnet with the magnetic actuator pad (as seen in FIG. 4B) and then sends a reset signal to the safety controller 122, which is communicated to the safety board controller 126. The safety board controller 126 controls the two safety brake devices 108*a*, 108*b* to reset their safety actuators in sequence, one after the other. The safety board controller 126 checks that the reset operation has been successful and sends a signal back to the controllers 120, 122. The service panel can be used to inform the technician about the success of the reset and the rest operation can be terminated, or optionally the elevator car 102 can be driven to a landing.

Figure 6:
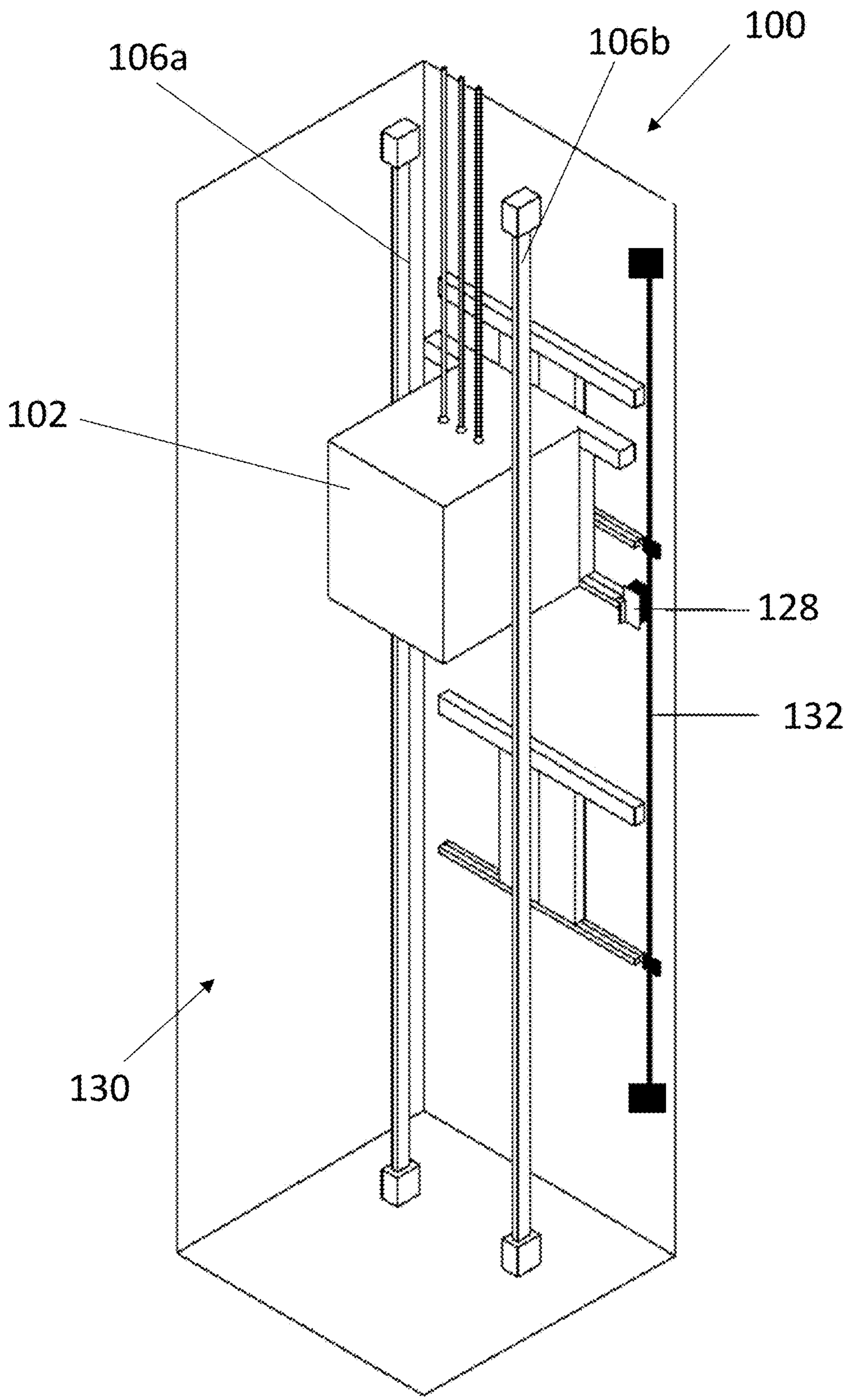
FIG. 6 shows an example of a position monitoring system in an elevator system.

FIG. 6 shows a perspective view of the elevator system 100 including the elevator car 102 arranged to move vertically along the guide rails 106*a*, 106*b* in a hoistway 130. The hoistway 130 includes a position measurement tape 132 for the position monitoring system 128 mounted to the elevator car 102. The position monitoring system 128 includes an absolute position sensor (e.g. a camera or other optical sensor) that can detect position markings e.g. increments, on the position measurement tape 132. The position monitoring system 128 can either process the collected data itself or pass the data to another component of the elevator system (e.g. the safety board controller 126, safety controller 122 or elevator controller 120) for further processing. This data is processed to determine a vertical position i.e. height, of the elevator car 102 within the hoistway 130. For example, each position marking could be unique and could be looked up in a lookup table (created in an initial calibration process) which includes the corresponding height for each position marking.

It will be appreciated by those skilled in the art that the disclosure has been illustrated by describing one or more specific aspects thereof, but is not limited to these aspects; many variations and modifications are possible, within the scope of the accompanying claims. For example, the safety brake devices disclosed herein may be used in a roped or ropeless elevator system.

What is claimed:

1. A method of resetting a safety actuator (52) in an elevator system (100), wherein:

the elevator system (100) comprises an elevator car (102) driven to move along a guide rail (106*a*, 106*b*), a safety brake (48) mounted to the elevator car (102) and operable to prevent movement of the elevator car (102) along the guide rail (106*a*, 106*b*), and a safety actuator (52) mounted to the elevator car (102), the safety actuator (52) comprising a magnetic actuator pad (54, 54') moveable laterally relative to the guide rail (106*a*, 106*b*);

the safety actuator (52) is mechanically coupled to the safety brake (48) and configured to trigger the safety brake (48) when a magnetic actuator pad (54, 54') is pushed laterally against the guide rail (106*a*, 106*b*) to create relative movement between the safety brake (48) and the elevator car (102); and the safety actuator (52) comprises an electromagnet (62) operable to pull the magnetic actuator pad (54, 54') laterally away from the guide rail (106*a*, 106*b*) when the electromagnet (62) is aligned with the magnetic actuator pad (54, 54') during a reset operation;

the method comprising:

upon receiving a signal to reset the safety actuator (52), moving the elevator car (102) upwards relative to the guide rail (106*a*, 106*b*) so as to release the safety brake (48); and operating the electromagnet (62) to pull the magnetic actuator pad (54, 54') laterally away from the guide rail (106*a*, 106*b*) to a reset position while the elevator car (102) is moving upwards during the reset operation.

2. The method of claim 1, further comprising:

monitoring the vertical position of the elevator car (102) while moving the elevator car (102) upwards relative to the guide rail (106*a*, 106*b*) so as to determine an alignment position where the electromagnet (62) is aligned with the magnetic actuator pad (54, 54').

3. The method of claim 2, further comprising:

after the elevator car (102) has reached the alignment position, continuing to move the elevator car (102) upwards relative to the guide rail (106*a*, 106*b*) while operating the electromagnet (62) to pull the magnetic actuator pad (54, 54') laterally away from the guide rail (106*a*, 106*b*).

4. The method of claim 1, wherein the safety actuator (52) comprises a stop (63) configured to prevent relative movement between the electromagnet (62) and the magnetic actuator pad (54, 54') once the electromagnet (62) is aligned with the magnetic actuator pad (54, 54') during upwards movement of the elevator car (102), the method comprising:

operating the electromagnet (62) to pull the magnetic actuator pad (54, 54') laterally away from the guide rail (106*a*, 106*b*) after the magnetic actuator pad (54, 54') has reached the stop (63).

5. The method of claim 1, wherein the elevator system (100) comprises an elevator controller (120) arranged to drive movement of the elevator car (102) along the guide rail (106*a*, 106*b*) and the safety actuator (52) comprises a safety board controller (126) in communication with the elevator controller (120);

the elevator controller (120) being arranged to receive a signal to reset the safety actuator (52) and to first drive movement of the elevator car (102) upwards relative to the guide rail (106*a*, 106*b*) so as to release the safety brake (48); and the elevator controller (120) then sending a reset signal to the safety board controller (126) to operate the electromagnet (62) to pull the magnetic actuator pad (54, 54') away from the guide rail (106*a*, 106*b*) while the elevator car (102) is still moving upwards during the reset operation.

6. The method of claim 1, wherein the elevator car (102) is driven to move along a pair of guide rails (106*a*, 106*b*), the elevator system (100) comprising a pair of the safety brakes (48) mounted either side of the elevator car (102) with corresponding first and second safety actuators (52) mechanically coupled to the pair of the safety brakes (48), the method comprising:

operating a first electromagnet (62) of the first safety actuator (52) to pull the magnetic actuator pad (54, 54') away from a first guide rail (106*a*, 106*b*) of the pair while the elevator car (102) is moving upwards during the reset operation; and subsequently operating a second electromagnet (62) of the second safety actuator (52) to pull the magnetic actuator pad (54, 54') away from a second guide rail (106*a*, 106*b*) of the pair while the elevator car (102) is still moving upwards during the reset operation.

7. The method of claim 1, wherein the safety brake (48) is arranged to be moveable between a non-braking position where the safety brake (48) is not in engagement with the guide rail (106*a*, 106*b*) and a braking position where the safety brake (48) is engaged with the guide rail (106*a*, 106*b*) to prevent movement of the elevator car (102) along the guide rail (106*a*, 106*b*).

8. An elevator system (100) comprising:

an elevator car (102) moveable along a guide rail (106*a*, 106*b*);

an elevator controller (120) arranged to drive movement of the elevator car (102) along the guide rail (106*a*, 106*b*);

a safety brake (48) mounted to the elevator car (102) and operable to prevent movement of the elevator car (102) along the guide rail (106*a*, 106*b*); and a safety actuator (52) mounted to the elevator car (102), the safety actuator (52) comprising a magnetic actuator pad (54, 54') moveable laterally relative to the guide rail (106*a*, 106*b*);

wherein the safety actuator (52) is mechanically coupled to the safety brake (48) and configured to trigger the safety brake (48) when a magnetic actuator pad (54, 54') is pushed laterally against the guide rail (106*a*, 106*b*) to create relative movement between the safety brake (48) and the elevator car (102);

wherein the safety actuator (52) comprises an electromagnet (62) operable to pull the magnetic actuator pad (54, 54') laterally away from the guide rail (106*a*, 106*b*) when the electromagnet (62) is aligned with the magnetic actuator pad (54, 54') during a reset operation;

wherein the elevator controller (120) is arranged, upon receiving a signal to reset the safety actuator (52), to move the elevator car (102) upwards relative to the guide rail (106*a*, 106*b*) so as to release the safety brake (48); and wherein the elevator controller (120) is arranged to send a signal to operate the electromagnet (62) to pull the magnetic actuator pad (54, 54') laterally away from the guide rail (106*a*, 106*b*) to a reset position while the elevator car (102) is moving upwards during the reset operation.

9. The elevator system (100) of claim 8, further comprising a position monitoring system (128) arranged to monitor the vertical position of the elevator car (102), wherein the elevator controller (120) is in communication with the position monitoring system (128) and arranged to determine an alignment position where the electromagnet (62) is aligned with the magnetic actuator pad (54, 54').

10. The elevator system (100) of claim 9, wherein the elevator controller (120) is arranged to send the signal to operate the electromagnet (62) after the elevator car (102) has reached the alignment position, while continuing to drive movement of the elevator car (102) upwards relative to the guide rail (106*a*, 106*b*).

11. The elevator system (100) of claim 8, wherein the safety actuator (52) comprises a stop (63) configured to prevent relative movement between the electromagnet (62) and the magnetic actuator pad (54, 54') once the electromagnet (62) is aligned with the magnetic actuator pad (54, 54') during upwards movement of the elevator car (102).

12. The elevator system (100) of claim 11, wherein the elevator controller (120) is arranged to send the signal to operate the electromagnet (62) after the magnetic actuator pad (54, 54') has reached the stop (63).

13. The elevator system (100) of claim 8, wherein the safety actuator (52) comprises a safety board controller (126) in communication with the elevator controller (120);

wherein the elevator controller (120) is arranged to receive a signal to reset the safety actuator (52) and to first drive movement of the elevator car (102) upwards relative to the guide rail (106*a*, 106*b*) so as to release the safety brake (48); and wherein the elevator controller (120) is arranged to then send a reset signal to the safety board controller (126) to operate the electromagnet (62) to pull the magnetic actuator pad (54, 54') away from the guide rail (106*a*, 106*b*) while the elevator car (102) is still moving upwards during the reset operation.

14. The elevator system (100) of claim 8, comprising a pair of guide rails (106*a*, 106*b*) along which the elevator car (102) is driven to move, a pair of the safety brakes (48) mounted either side of the elevator car (102), and corresponding first and second safety actuators (52) mechanically coupled to the pair of the safety brakes (48), wherein the elevator controller (120) is arranged to:

send a first signal to operate a first electromagnet (62) of the first safety actuator (52) to pull the magnetic actuator pad (54, 54') away from a first guide rail (106*a*, 106*b*) of the pair while the elevator car (102) is moving upwards during the reset operation; and subsequently send a second signal to operate a second electromagnet (62) of the second safety actuator (52) to pull the magnetic actuator pad (54, 54') away from a second guide rail (106*a*, 106*b*) of the pair while the elevator car (102) is still moving upwards during the reset operation.

* * * * *